United States Patent Office 2,956,106
Patented Oct. 11, 1960

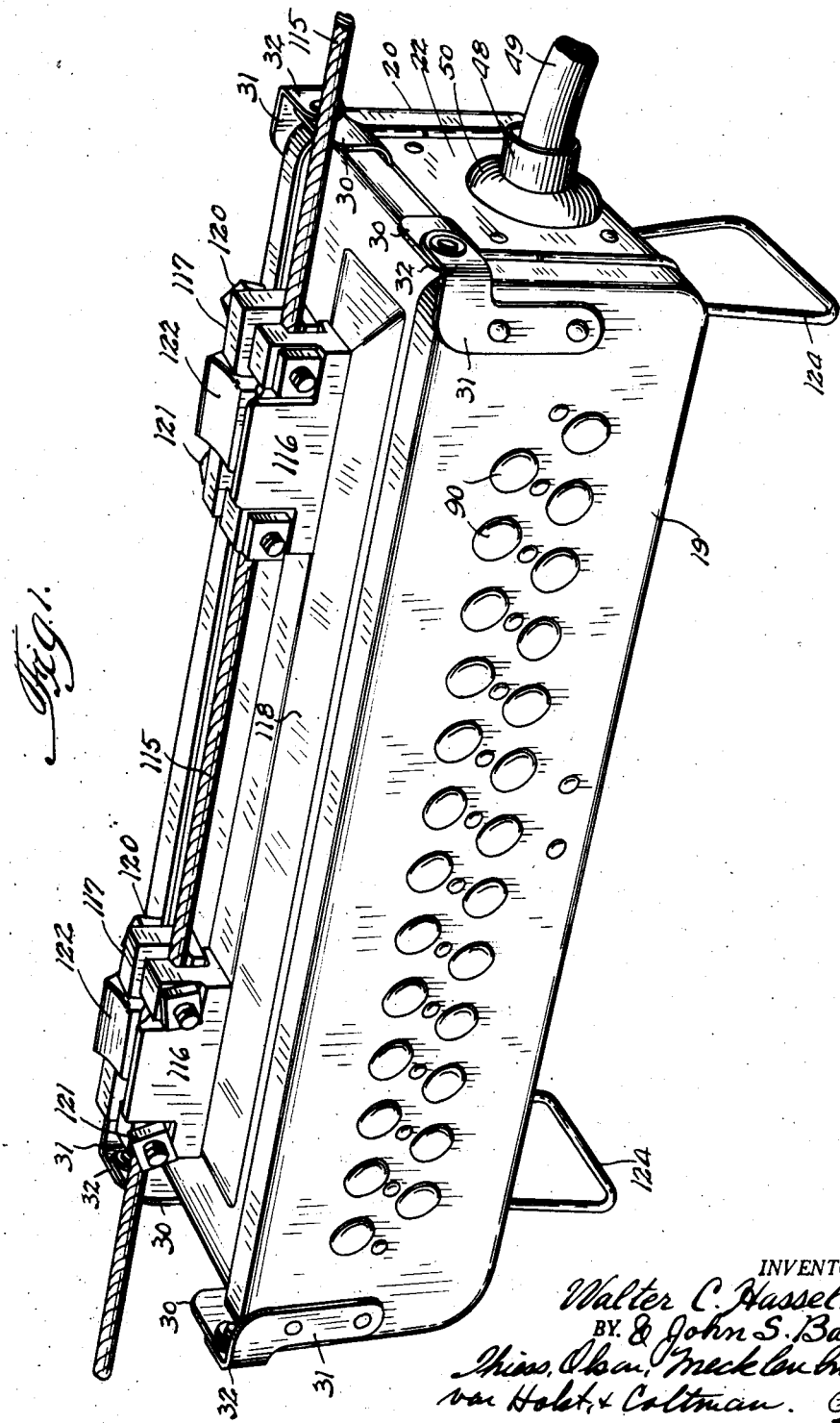

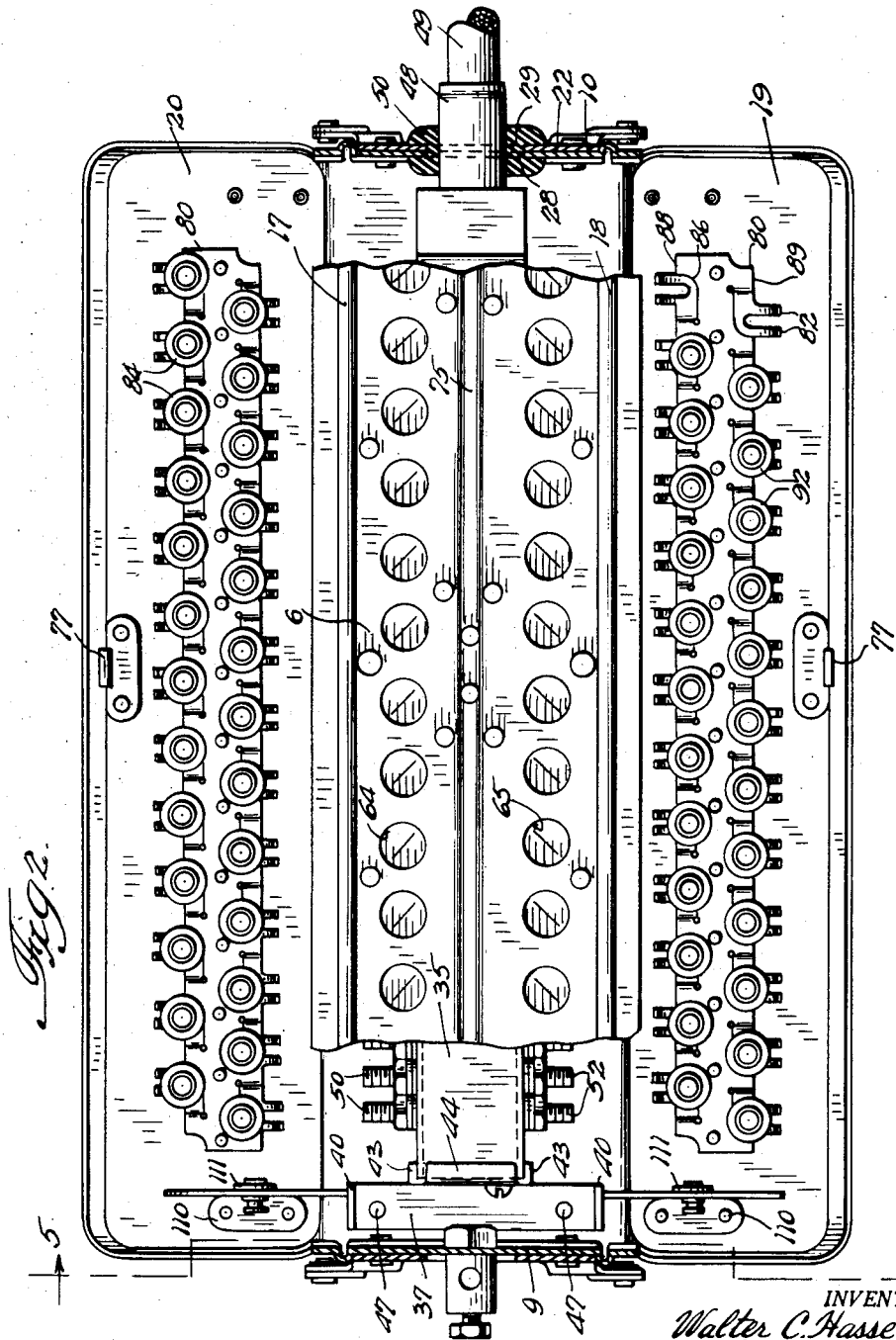

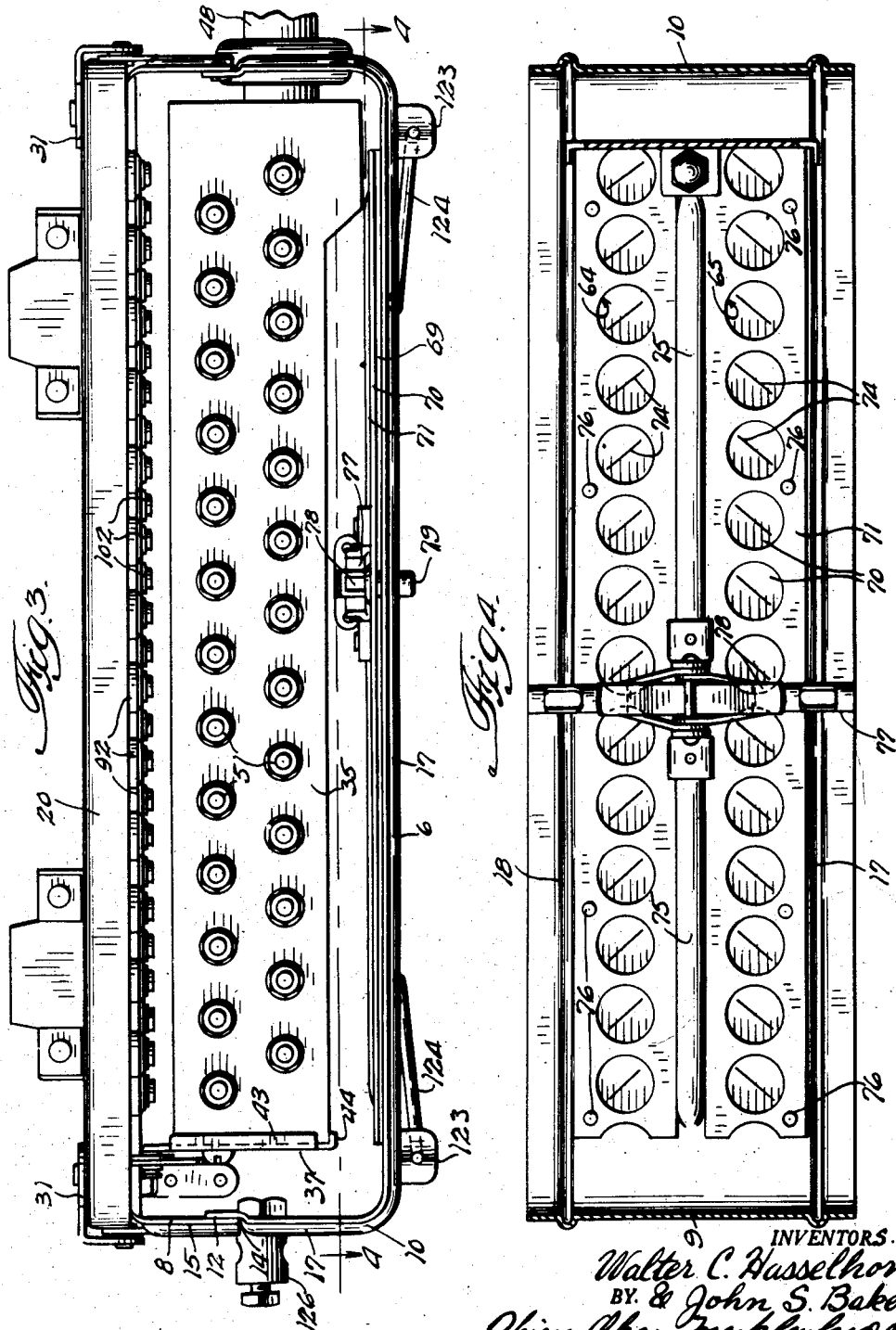

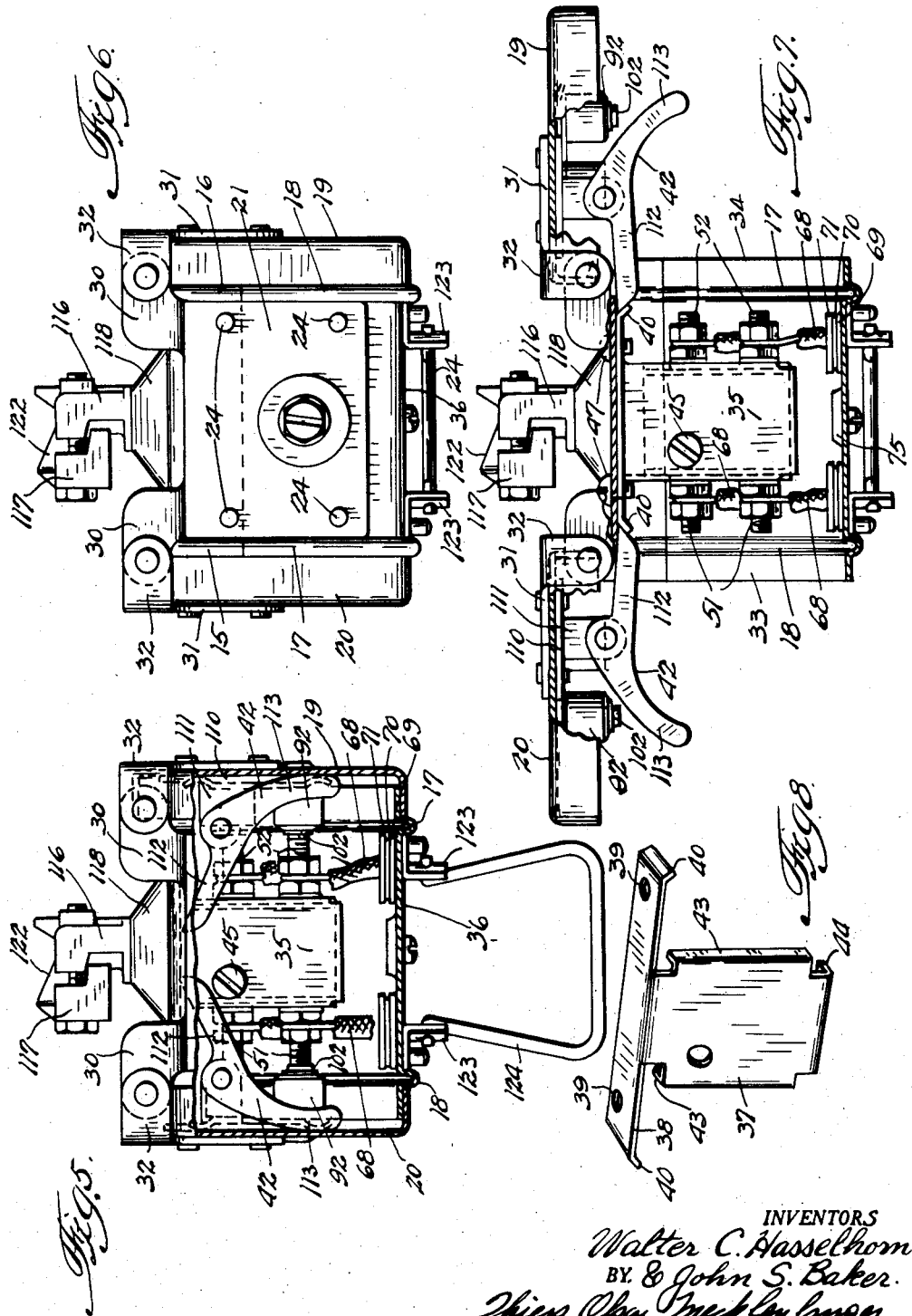

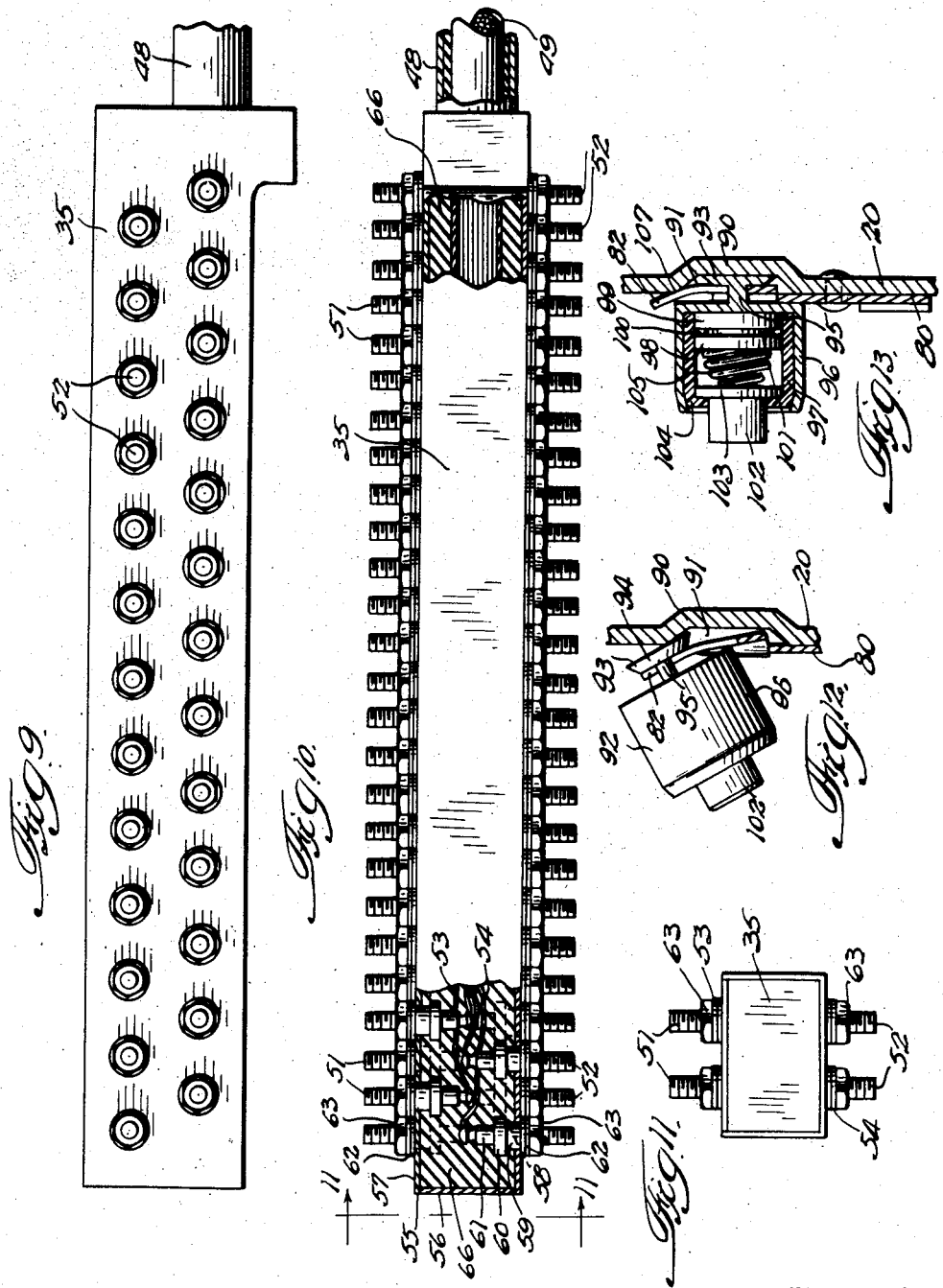

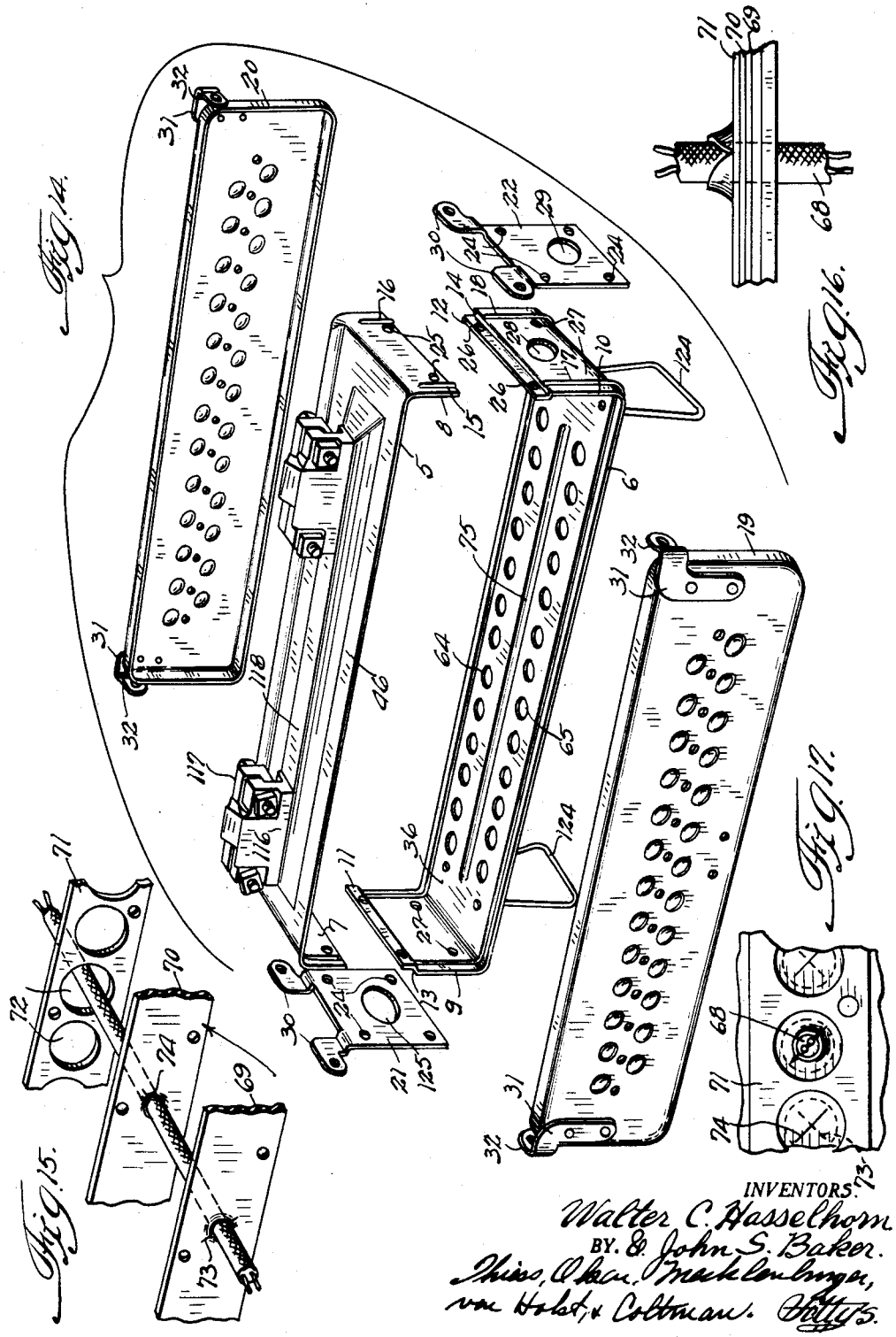

2,956,106

STRAND TYPE TERMINAL BOX

Walter C. Hasselhorn, Evanston, and John S. Baker, Skokie, Ill., assignors, by mesne assignments, to Cook Electric Company, Chicago, Ill., a corporation of Delaware Filed June 17, 1955, Ser. No. 516,242

3 Claims. (Cl. 174—59)

This invention relates to cable terminals and more particularly to terminal boxes for electric cables adapted to be mounted adjacent to telephone poles and other like supports, carrying telephone line cables, to provide for ready connection of cable conductors to the drop wires leading to subscribers' instruments.

Terminal boxes of the character referred to are usually mounted on poles where it is difficult to work, especially if the interiors of the boxes are not readily accessible. Usually, it is desirable to protect the cable against the entrance of moisture by providing a moisture-tight chamber or compartment into which the cable may be extended and its wires distributed to the terminal posts or studs of the subscriber's lines. However, it is preferable that these terminal posts or studs be readily accessible in order to permit making the necessary changes in and additions to the wiring connections that must be made at different times to correspond to changes in and additions to the customers' lines. These terminal posts or studs are generally provided to receive the cable wires at one end and to receive the drop wires leading to the subscribers' instruments at the other end. In certain instances, it is desirable to protect the equipment against injurious current that may surge through the lines at times by providing high potential arresters or discharger protection. The need for it may not be apparent until after the original installation or until additional subscribers' lines are added.

The arrangement of the parts for effecting a moisture seal has heretofore required the use of costly and sometimes intricate structures. The known arrangements have been found, however, to be unsatisfactory, particularly from the standpoint of easy access to the terminal and connections thereto by linemen braced in hazardous positions on telephone poles. Moreover, these arrangements required the mounting of the terminal box in a position on the pole where linemen might step thereon while climbing about on the pole. Such a location is undesirable and may cause damage to the terminal. When the terminal box is mounted on the pole, replacement of the pole itself quite often resulted in a disturbance of the connections because if the new pole failed to be spotted exactly like the old pole, adjustment of the connections to the terminal box had to be made.

In copending application Serial No. 447,753, filed August 4, 1954, now U.S. Patent No. 2,859,390, there is disclosed an improved construction of a terminal box whereby a terminal unit is adapted to be secured within the terminal box to receive the cable at one of its end walls. Terminal posts project from the front wall of the terminal unit so as to be accessible for receiving drop wires leading to subscribers' instruments and for permitting the making of necessary changes in and additions to these connections. A cover is carried upon a mounting providing a snap-over action while arresters are carried by the cover in detachable relation to furnish protection to subscribers' lines when necessary. It has been found, however, that certain installations require numerically greater terminal capacities in that additional subscribers' lines have to be accommodated at or substantially at the same locations, which means that additional terminal boxes must be provided at a greatly added cost.

It is the purpose of this invention to reduce this added cost by providing a simplified terminal box construction that permits a substantial increase in the number of subscribers' lines that can be accommodated at a cable terminal location. It is a further purpose of this invention to provide this additional terminal capacity with a readily accessible terminal box assembly, featuring maximum convenience for linemen working braced in hazardous positions on telephone poles and like places.

To this end the terminal box, although capable of varied design, is preferably formed of U-shaped upper and lower portions having overlapping legs provided with end plates for reinforcing and securing the overlapped legs of these portions together. This very simple, inexpensive and secure structure is provided with covers which are swingably-mounted and self-locking in their raised open position. This arrangement affords ready access to the terminal posts at the open side faces of the body of the box. A terminal unit having terminal posts facing each side of the box is suspended over and above the floor of the lower body portion. Thus, the customer's drop wires may be connected to terminal posts on opposite sides of the terminal unit and then readily led out through openings in the bottom of the box. This greatly increases the drop-wire capacity of the terminal box without substantially increasing construction costs of such boxes. Moreover, such an arrangement provides maximum convenience and accessibility to linemen.

Other objects and advantages of the invention will be apparent from the following detailed description when taken in connection with the accompanying drawings which form a part hereof.

In the drawings:

Fig. 1 is a perspective view of a terminal box embodying the persent invention and showing the same suspended from the cable wire or strand supporting the telephone conductor cable;

Fig. 2 is a bottom plan view of the device shown in Fig. 1 with bottom wall portions broken away at both ends to illustrate the manner of supporting the terminal unit and with the covers open to show the parts employed to produce the self-locking action of the covers in raised position;

Fig. 3 is a side view of the device shown in Fig. 1 but with one of the covers in raised open position;

Fig. 4 is a detail sectional view taken along line 4—4 of Fig. 3 and looking in the direction of the arrows to illustrate the conductor outlets in the floor of the housing and the device employed to lock the covers closed;

Fig. 5 is a detail end elevation, partly in section, with the end wall broken away to illustrate the position of the locking arms of both covers when they are in closed position;

Fig. 6 is an end elevation of the structure shown in Fig. 5;

Fig. 7 is a transverse sectional view taken through the housing body with the covers in open position and showing the locking arms holding the covers in raised open position;

Fig. 8 is a detail view of the bracket employed at one end of the structure to suspend the terminal unit above and over the floor of the housing;

Fig. 9 is a detail view illustrating the terminal posts projecting from a face of the terminal unit opposite one of the covers;

Fig. 10 is a view partly in elevation and partly in section of the terminal unit;

Fig. 11 is a view taken along line 11—11 of Fig. 10 and looking in the direction of the arrows;

Fig. 12 illustrates a spring mounting and the manner of inserting an arrester in this mounting;

Fig. 13 is a transverse sectional view through the arrester and the spring mounting;

Fig. 14 is an exploded view of the parts comprising the body of the housing and the covers;

Fig. 15 illustrates in exploded relation the parts providing a seal for the terminal outlets in the floor of the terminal unit;

Fig. 16 illustrates the manner in which these parts continue to provide an effective seal as the conductor is passed therethrough; and Fig. 17 is a fragmentary elevation of several of these seals to illustrate how the seal is effected.

Referring to the drawings, especially Fig. 14, the invention in one of its practical embodiments comprises a cable terminal structure having a body formed of a few simple easily made and assembled parts. This body may be formed of an upper portion 5 and a lower portion 6, both being substantially U-shaped, with the legs 7 and 8 overlapping the legs 9 and 10. Legs 9 and 10 are inwardly offset at 11 and 12 equal to the thickness of the metal of legs 7 and 8 so that the lower portion of the latter may engage against these offset flanges 11 and 12 and rest upon offset seats 13 and 14 whereby the outer faces of legs 7 and 8 are flush with the outer faces of legs 9 and 10. Upper portion 5 and lower portion 6 may be formed by stamping or drawing which uniquely permits reinforcing ribs 15 and 16 to be formed on the upper portion 5 and matching reinforcing ribs 17 and 18 to be formed on lower portion 6. These ribs may extend the entire length of lower portion 6 to reinforce the same and to provide a closing abutment for covers 19 and 20 to be presently described.

With legs 7 and 8 of upper portion 5 overlapping legs 9 and 10 of lower portion 6, end plates 21 and 22 are mounted against the outer faces of these legs and riveted at 24 to hold these parts securely together. Holes 25 in flanges 7 and 8 are adapted to align with holes 26 in flanges 11 and 12. The upper set of openings 24 in plates 21 and 22 will also align with openings 25 and 26. The lower legs 9 and 10 of lower portion 6 are also provided with openings 27 which align with lower openings 24 in end plates 21 and 22. Plates 21 and 22 are preferably seated between ribs 15 and 17 and 16 and 18. A cable terminal opening 28 is provided in leg 10 and is adapted to align with a corresponding opening 29 in end plate 22.

Each end plate 21 and 22 is provided with a pair of offset lugs 30 which project upwardly and outwardly from each end of the housing (see Fig. 1). Offset brackets 31 are fixed to the outer upper corners of covers 19 and 20. These brackets 31 are furnished with offset tips 32 adapted to align and engage with offset lugs 30 of end plates 21 and 22. Suitable rivet connections secure brackets 31 to lugs 30 so that when the covers are raised to open position they will clear the area in front of the two side faces designated 33 and 34 in Fig. 7. These open side faces 33 and 34 are formed by reason of the fact that the upper and lower portions 5 and 6 of the body are channel-shaped with overlapping end legs as heretofore described. Substantially four parts form the entire body of the housing with covers 19 and 20 providing tight fitting closures for the open side faces 33 and 34.

A terminal unit 35 (Figs. 2, 3, 5 and 7) is adapted to be mounted in suspended position in the housing above and over floor 36 of lower body portion 6. This suspension is accomplished by a simple form of bracket 37 illustrated in detail in Fig. 8 and shown mounted in the housing carrying terminal unit 35 in Figs. 3, 5 and 7. Bracket 37 may be a simple and inexpensive form of stamping having a flat upper bar 38 provided with threaded openings 39 and wing tips 40 at each end to serve as stops for locking detents 42 which hold covers 19 and 20 in raised open position as shown in Fig. 7. The body of bracket 37 is formed with side flanges 43 and a bottom flange 44 to receive the free end of terminal unit 35, the latter being held in embraced relation by this bracket 37 by means of a screw 45. Top bar 38 is held flatly against the underside of the top face 46 of top body portion 5 of the housing by means of screws 47 threading into tapped openings 39 in bar 38. The opposite end of terminal unit 35 receives a nipple 48 into and through which the conductor cable 49 extends. A grommet 50 is inserted in opening 29 in end plate 22 and opening 28 in leg 10 of the lower body portion 6 so that the interior of the housing is effectively moisture-sealed at this connection.

As illustrated in Fig. 10, terminal unit 35 carries two sets of terminal posts or studs 51 and 52 to which wires 53 and 54 are attached in sealed relation within the unit. Unit 35 preferably comprises a casing 55 of channel shape with end walls 56 and two side walls 57 and 58. One of these end walls preferably receives nipple 48 and the conductor cable 49 in any suitable manner. Posts 51 and 52 are constructed with cylindrical portions 59 passing through openings in the side walls 57 and 58 and with square shoulders 60 and ends 61 to which cable wires 53 and 54 are attached in the usual way. Terminal posts 51 and 52 have the usual washers 62 and lock nuts 63 for the purpose of securing the customer's drop wires leading out of the housing through outlet apertures 64 and 65 in floor 36 of lower body portion 6. After the cable wires 53 and 54 are attached to terminal post ends 51 and 52, unit 35 is filled with an insulating compound 66 which securely anchors all the terminal posts in position and seals the connection between the ends 61 with cable conductors 53 and 54. As illustrated in Fig. 10, insulating compound 66 also seals the open end of the sheath of conductor cable 49 and the space between this sheath and nipple 48 whereby the interior of cable 49 is effectively moisture-sealed at its connection to unit 35.

As will be readily apparent from Fig. 7, the arrangement of terminal posts 51 and 52 on opposite sides of walls 57 and 58 make these terminal posts readily accessible when covers 19 and 20 are in raised open position to permit the necessary changes and additions to the wire connections that must be made at different times to correspond to the changes and additions to the customer's lines. The convenience of making connections between the customer's drop wires 68 and these terminal posts 51 and 52 when covers 19 and 20 are in raised open position will be also noted in this Fig. 7. The customer's wires 68 pass out of the housing through the outlet openings 64 and 65, each of these openings being larger in diameter than the wires 68. A moisture-seal is furnished at openings 64 and 65 by means of a plurality of flexible strips 69 and 70 adapted to be clamped against the inside face of floor 36 by a clamping plate 71 which also has a plurality of conductor openings 72 therein larger than the diameter of the wires 68. Each flexible strip 69 and 70 is slit as illustrated at 73 and 74, respectively (Fig. 15). Slits 73 and 74 are cut at an angle with respect to each other, and in the preferred form of the structure, these slits are cut preferably perpendicular to each other but of lesser length than the diameter of the conductor openings 64 and 65 in the floor 36 and the conductor openings 72 in clamping plate 71. The customer's drop wires are adapted to be pushed through slits 73 and 74 and because strips 69 and 70 are flexible the edges will tend to conform these strips 69 and 70 at the slits to the contour of the conductors 68. The manner in which flexible strips 69 and 70 tend to cling about the surfaces of these conductors is illustrated in detail in Fig. 16. To strengthen lower body portion 6 lengthwise, its floor 36 is preferably formed with a rib 75 lengthwise thereof and lying between and dividing each row of conductor outlets 64 and 65. It is, of course, desirable under these conditions to provide a set of separate strips 69, 70 and 71 for each row of outlet openings and to attach each set separately by a series of rivets 76 as noted in Fig. 4.

Each cover 19 and 20 is provided with a latching finger 77 (Figs. 2 and 4) adapted to cooperate with a spring-pressed member 78 controlled by a button 79 extending below floor 36. This latching mechanism keeps the cover tightly held in closed position with the edges against aligned ribs 15 and 17 of the body parts 5 and 6.

The terminal box structure disclosed herein is further novelly provided with a spring plate 80 (Fig. 2) riveted to the underside of each cover. Inasmuch as the mechanism is the same in each cover, only one structure will be described. Spring plate 80 is uniquely designed and formed to provide a series of integral cliplike fingers 82 arranged in pairs to removably receive arresters 92. This plate 80 is preferably a sheet metal stamping that is cut at a plurality of predetermined points 85 and then formed with curved portions 86 so that each portion forms an integral springlike mounting for said spring fingers. In forming plate 80, these fingers are arranged in two rows so as to extend beyond edges 88 and 89. As shown in Figs. 12 and 13, fingers 82 are curved slightly outwardly. Each cover is also formed with two rows of upset portions 90 to provide pockets 91 directly behind each pair of spring fingers 82.

Individual arresters or dischargers 92 are each provided with a disk 93 having a tapered surface 94 and an extended reduced neck 95 that may be integral and carried by housing 96 of the arrester. Within housing 96 is mounted an insulation casing 97, within which casing 97 and housing 96 are located spark gap electrodes 98 and 99 and dielectric ring 100 between them. The electrodes will be of the same material and size and are preferably small circular disks of suitable high grade carbon. The inner or bottom electrode 99 fits and is seated in the bottom of outer housing 96 and therefore is in good contact therewith. Dielectric ring 100 may be in the form of thin celluloid or other suitable material with a comparatively large circular opening 101 in the midsection and its outer periphery is in direct contact with the inner insulating unit 97. By this arrangement the inner electrode 99 is positively separated by the insulated dielectric ring 100 from the electrode 98. Each discharger 92 is provided with a protruding contact terminal 102 having a head 103 thereon riding within the inner insulating sleeve 97 and held from displacement by the inward turned flange 104 formed on sleeve 97. Head 103 bears against a coil spring 105 disposed between this head and the carbon electrode 98.

If a particular pair of customer's terminal posts 51 or 52 and the connecting drop wires 68 should have protection, it is only necessary then to insert the button type discharger or arrester 92 disclosed herein in the pair of spring fingers 82 disposed directly over this pair of terminal posts. This can be easily done by sliding head 93 between springs fingers 82 and the tapering wall of the corresponding recess 91 in the housing cover. As illustrated in Fig. 12, this action causes the spring fingers 82 to be flexed outward slightly to allow this tapered head 93 to slip down and into this recess 91 as illustrated in Fig. 13. Spring fingers 82 then resiliently snap back into position to engage the wall of the cover at the corner 107 formed at the entrance of this recess 91. In this manner, considerable equipment may be saved or not put into use unnecessarily because only such subscriber's lines as require protection may be provided with dischargers or arresters 92.

When either of the covers 19 or 20 is brought into closed position, as illustrated in Fig. 5, the protruding electrodes 102 are brought into spring-pressed relation with the terminal posts directly thereunder and are therefore in good contact therewith. These electrodes 102 bear against coil spring 105 within the arresters which assure that good contact is maintained. Moreover, coil springs 105 maintain a relatively uniform spark gap 101 because these coil springs function to keep the electrodes 98 and 99 firmly pressed toward each other with the dielectric ring 100 acting as an attachment spacer therebetween.

Carried on each cover at one end is a bracket 110 fastened in any suitable way as by riveting or the like and provided with a depending arm 111. Arm 111 is adapted to pivotally carry detent lever 42 comprising two arms 112 and 113. The arrangement is such that detent lever 42 will drop by gravity from the position it assumes within the housing when covers 19 and 20 are closed, as illustrated in Fig. 5. However, when covers 19 and 20 are raised to their open position, as illustrated in Fig. 9, detent levers 42 will automatically drop to the position shown in this figure whereby the forward tips of arm 112 will engage against locking lugs 40. As each cover is raised, the detent lever 42 drops to a position bringing its arm 112 horizontally. As the cover is allowed to drop slightly, the tip of this arm 112 is then behind locking lug 40, as illustrated in Fig. 7, to hold the cover in its open position. Arm 113 is curved slightly in trigger fashion so that it may be readily engaged by a finger and raised slightly with the cover to free the forward tip of arm 112 from locking lug 40 when it is desired to close the cover. The weight of each cover will normally cause its part 77 to ride under the spring-pressed locking member 78 so as to lock the cover closed.

Fig. 1 illustrates the cable terminal mounted in suspended position upon a wire 115 supporting the telephone cable 49 adjacent to a telephone pole. This suspension mounting is accomplished through a pair of clamping blocks designated broadly as 116 and 117. Clamping block 116 may be attached to a raised portion 118 in upper body member 5 by suitable bolts (not shown). Inasmuch as upper body portion 5 is preferably a stamping, this raised portion 118 may be drawn in the stamping operation to effect strengthening of this top body 5, particularly where connected to this clamping structure. Clamping member 117 is preferably adjustable by bolts 120 and 121 so that supporting wire 115 may be brought between the clamping members 116 and 117 and locked under part 122 of the movable clamp member 117. In this fashion the cable terminal unit is easily and readily suspended from the telephone cable wire 115 at any location along this wire so that, if, for instance, upon replacement of a telephone pole the new location does not exactly coincide with the location of the replaced pole, the unit may be easily slid along wire 118 to be brought next to the new pole.

The underside of the floor 36 of lower body portion 6 may have a pair of brackets 123 secured thereunder at each end and to receive a U-shaped wire ring 124 that may be swung downwardly as shown in Fig. 1 to permit the lineman to bunch the customer's drop wires in accordance with the plan of distribution.

At the end of the body opposite to the end receiving the telephone cable, end plate 21 is provided with an opening 125 to permit a grounding stud 126 to be connected in any suitable way to leg 9 of lower body portion 6. Thus the housing is adequately grounded to care for any excessive charges grounding through arrester electrodes 98 and 99, the electrode 99 being in grounded relation to the covers 19 and 20 and these covers being carried, of course, by the body of the housing.

Without further elaboration, the foregoing will so fully explain the character of our invention that others may, by applying current knowledge, readily adapt the same for use under varying conditions of service, without eliminating certain features, which may properly be said to constitute the essential items of novelty involved, which items are intended to be defined and secured to us by the following claims:

We claim:
1. A cable terminal box assembly characterized by an increased number of terminals of given size per unit volume, and optimum ease of access, installation and maintenance, said assembly comprising: a U-shaped upper member; a U-shaped lower member provided with openings for accommodating conductors; means for fastening together in overlapping relation the legs of said first and second U-shaped members to form a rigid frame having an end, a cable entrance-opening at another end, a top, a bottom, and first and second open sides; a first cover for said first open side and a second cover for said second open side; first means pivotally coupling said first cover to said frame, and second means pivotally coupling said second cover to said frame, thereby forming an accessible enclosure when said covers are closed; means coupled to said top and to said first cover for latching individually and releasably said first cover in an open position exposing said first open side, and further means coupled to said top and said second cover for latching individually and releasably said second cover in an open position exposing said second side; means coupled to said bottom for latching individually and releasably each of said covers in a closed position; and an elongated terminal unit in said enclosure attached to said top and having a cavity and a multiplicity of terminal posts communicating between said cavity and the exterior of said unit.

2. A cable terminal box assembly characterized by an increased number of terminals of given size per unit volume, and optimum ease of access, installation and maintenance, said assembly comprising: a U-shaped upper member; a U-shaped lower member provided with openings for accommodating conductors; means for fastening together in overlapping relation the legs of said first and second U-shaped members to form a rigid frame having an end, a cable entrance-opening at another end, a top, a bottom, and first and second open sides; a first cover for said first open side and a second cover for said second open side; first means pivotally coupling said first cover to said frame, and second means pivotally coupling said second cover to said frame, thereby forming an accessible enclosure when said covers are closed; means coupled to said top and to said first cover for latching individually and releasably said first cover in an open position exposing said first open side, and further means coupled to said top and said second cover for latching individually and releasably second cover in an open position exposing said second side; means coupled to said bottom for latching individually and releasably each of said covers in a closed position; an elongated terminal unit in said enclosure attached to said top and having a cavity and a multiplicity of terminal posts communicating between said cavity and the exterior of said unit; means for coupling to said terminal post the conductors of a multi-conductor cable disposed in said cavity; and a multiplicity of means disposed on said covers in electrical contact with the said terminal posts whenever said covers are in closed position for discharging between said posts and said covers electrical potentials exceeding a predetermined magnitude.

3. A cable terminal box assembly characterized by an increased number of terminals of given size per unit volume, and optimum ease of access, installation and maintenance, said assembly comprising: a U-shaped upper member; a U-shaped lower member provided with at least two rows of openings for accommodating conductors; means including first and second end plates for fastening together in overlapping relation the legs of said first and second U-shaped members to form a rigid frame having an end, a cable entrance opening at another end, a top, a bottom, and first and second open sides; a first cover for said first open side, and a second cover for said second open side; means pivotally coupling said first and second covers to said first and second end plates, whereby an accessible enclosure is formed when said covers are closed; means in cooperative engagement with said top and said first cover for latching individually and releasably said first cover in a position approximately perpendicular to said first open side, and further means in cooperative engagement with said top and said second cover for latching individually and releasably said second cover in a position approximately perpendicular to said second open side, whereby said covers provide a shelter for work on said terminal connection when said covers are latched in their open position; means coupled to said bottom for latching individually and releasably each of said covers independently in a closed position; an elongated terminal unit in said enclosure attached to said top and having a cavity and a plurality of terminal posts communicating between said cavity and the exterior sides of said unit facing said covers when the latter are closed; means for coupling to said terminal post the conductors of a multi-conductor cable disposed in said cavity; and a plurality of means disposed on said covers in electrical contact with said terminal posts whenever said covers are in closed position for discharging between said posts and said covers electrical potentials exceeding a predetermined magnitude.

References Cited in the file of this patent

UNITED STATES PATENTS

| | | |
|---|---|---|
| 2,126,891 | Kelsay | Aug. 16, 1938 |
| 2,318,755 | Channell | May 11, 1943 |
| 2,480,568 | Garvin | Aug. 30, 1949 |
| 2,507,363 | Baker | May 9, 1950 |
| 2,533,137 | Neale | Dec. 5, 1950 |
| 2,798,781 | Anderson | July 9, 1957 |

FOREIGN PATENTS

| | | |
|---|---|---|
| 23668–01 | Great Britain | Oct. 23, 1902 |
| 155,449 | Great Britain | Dec. 23, 1920 |
| 568,529 | France | Apr. 8, 1925 |
| 451,382 | Great Britain | Aug. 5, 1936 |
| 403,154 | Italy | Apr. 7, 1943 |